Oct. 18, 1960 — S. BOWMAN — 2,956,451
PLANETARY GEAR-TYPE SPEED REDUCER
Filed Feb. 17, 1959 — 2 Sheets-Sheet 1

INVENTOR:
SPENCER BOWMAN
BY Alfred C. Body
ATTORNEY

Oct. 18, 1960 S. BOWMAN 2,956,451
PLANETARY GEAR-TYPE SPEED REDUCER
Filed Feb. 17, 1959 2 Sheets-Sheet 2

INVENTOR.
SPENCER BOWMAN
BY
Alfred C. Body
ATTORNEY

United States Patent Office

2,956,451
Patented Oct. 18, 1960

2,956,451

PLANETARY GEAR-TYPE SPEED REDUCER

Spencer Bowman, 1635 Riverside Drive, Lakewood, Ohio

Filed Feb. 17, 1959, Ser. No. 793,771

14 Claims. (Cl. 74—801)

This invention relates generally to a gear-type speed changer, and particularly to a speed reducer of the planetary gear type.

Speed reducers of the general type to which the present invention is directed normally have a pair of spaced end walls separated by a ring gear, a rotatable sun gear between the end walls and inside the ring gear, a plurality of planetary gears disposed around the sun gear and engaged between the sun gear and the ring gear in mesh with both, a rotatable holder for the planet gears, an input shaft extending through one of the end walls and connected to the sun gear, and an output shaft extending rotatably through the opposite end wall and coupled to the planetary gear holder to be driven thereby. Speed reducers of this general type have been found to be capable of handling extremely high mechanical powers and of providing a wide range of ratios of input to output speeds.

The gears in such speed reducers operate under extremely high load in order that maximum torque can be transmitted within a minimum space. Because of this, such speed reducers in the past were required to be manufactured to extremely close tolerances and all of the operating parts had to be accurately aligned. These requirements contributed appreciably to the high cost of manufacturing such speed reducers.

The present invention is directed to a novel and improved speed reducer of the planetary gear type which reduces these requirements, thereby enabling the speed reducer to be manufactured at lower cost, but without sacrificing any of the desired operating characteristics.

Another problem associated with speed reducers of this general type has been the necessity of mounting the speed reducer on uneven or misaligned surfaces, with the result that when the mounting feet on the housing are tightened against such surfaces the housing of the speed reducer is subjected to twists and strains sufficient to cause misalignment of the axes of the gears. Excessive wear, noise and friction oftentimes were the result. To minimize this difficulty, in the past it was conventional practice to provide a housing for the speed reducer which was very heavy and rigid. Such a massive housing structure added to the weight and bulk of the unit, as well as to its cost of manufacture.

The present invention deals with this problem by arranging the end walls of the housing, to which the mounting feet for the housing are attached, to be capable of turning about the rotational axis of the sun gear in the event that misalignment forces occur when the mounting feet are tightened against uneven or misaligned mounting surfaces. Such movement of the end wall does not in any way affect the alignment of the gears in the speed reducer, nor does it otherwise adversely affect the operation of the speed reducer. At the same time, this novel construction avoids the necessity of providing an unduly heavy and rigid housing for the speed reducer.

Another problem associated with planetary gear type speed reducers has been that of shock loading on the gear teeth in the reducer. This has been due primarily to rapid starts, rapid stops, or both, of the apparatus which the speed reducer is driving.

Such shock loading, if high enough, can cause a breakdown of the lubricating film between the meshing gear teeth, resulting in high wear and, in some cases, early failure of the speed reducer.

This difficulty is avoided in the present invention by providing a ring gear which is capable of turning with respect to the end walls under high stress and which is distortable radially to cushion the shock load and to limit the amount of rotation of the ring gear with respect to the end walls. With this arrangement, the respective loads on the individual planet gears in the reducer are substantially equalized under all conditions of operation.

Another problem in speed reducers of this general type has been the demand for a very large number of reducing ratios by industry. In order to meet such demands it has been necessary heretofore to carry a large and expensive inventory of gear reducers, not only for each desired speed ratio, but for all of the various horsepower ratings and speeds of rotation, both input and output. While it might appear to be desirable for the distributor or user to simply stock a number of gear reducer housings and a large number of gears so that the various speed reducing ratios could be established by assembling the appropriate gears in such housings, in practice this is not feasible. The extremely close tolerances required in planetary type gear reducers, in order to insure that all the planetary gears will transmit a portion of the load, have made such an expedient impossible, as a practical matter, and have made it a practical requirement that each reducer be completely assembled by the manufacturer.

The importance of this problem is evident from the fact that even in the most carefully constructed planetary gear type speed reducers, when the speed reducer is operated at or close to its maximum rated loading the speed reducer failed ultimately. Upon inspection it was found that usually such failure was due to the fact that only one of the planetary gears had been carrying the entire load, while the other planetary gears were merely idling.

The present invention deals with these problems by arranging the sun gear and the planetary gear carrier to be capable of limited radial movement with respect to the input and output shafts and with respect to each other, and with respect to the ring gear, so that each may self-align itself radially with the other gears. Further, in accordance with the present invention, the ring gear has an outer ring portion of a thickness appreciably less than was provided heretofore in such devices. This outer ring portion is distortable radially under high loading so that the respective loads on all of the planetary gears will be substantially equalized. In this manner, the primary cause of failure of speed reducers of this type is substantially completely eliminated.

It is an object of this invention to provide a novel and improved speed changer of the planetary gear type.

It is also an object of this invention to provide a novel and improved planetary gear-type speed reducer having a housing which is self-adjusting to accommodate irregularities in the surface on which it is mounted without subjecting the housing or the gearing to strain.

Another object of this invention is to provide a novel and improved planetary gear type speed reducer which is not damaged by momentary shock loads.

Still another object of this invention is to provide a novel and improved planetary gear-type speed reducer having novel provision for insuring that all of the planetary gears carry a proportionate share of the load, particularly at the maximum load rating of the reducer.

A further object of this invention is to provide a new and improved planetary gear type speed reducer in which all of the gears are self-aligning.

A still further object of this invention is to provide a novel and improved planetary gear-type speed reducer which may be easily assembled and disassembled by inexperienced people.

Another object of this invention is the provision of a novel and improved planetary gear type speed reducer in which the planetary gears may be readily changed to provide different speed ratios or may be stacked axially to provide a maximum range of speed ratios.

Further objects and advantages of the present invention will be apparent from the following description of two exemplary embodiments thereof which are illustrated in the accompanying drawings.

Figure 1:
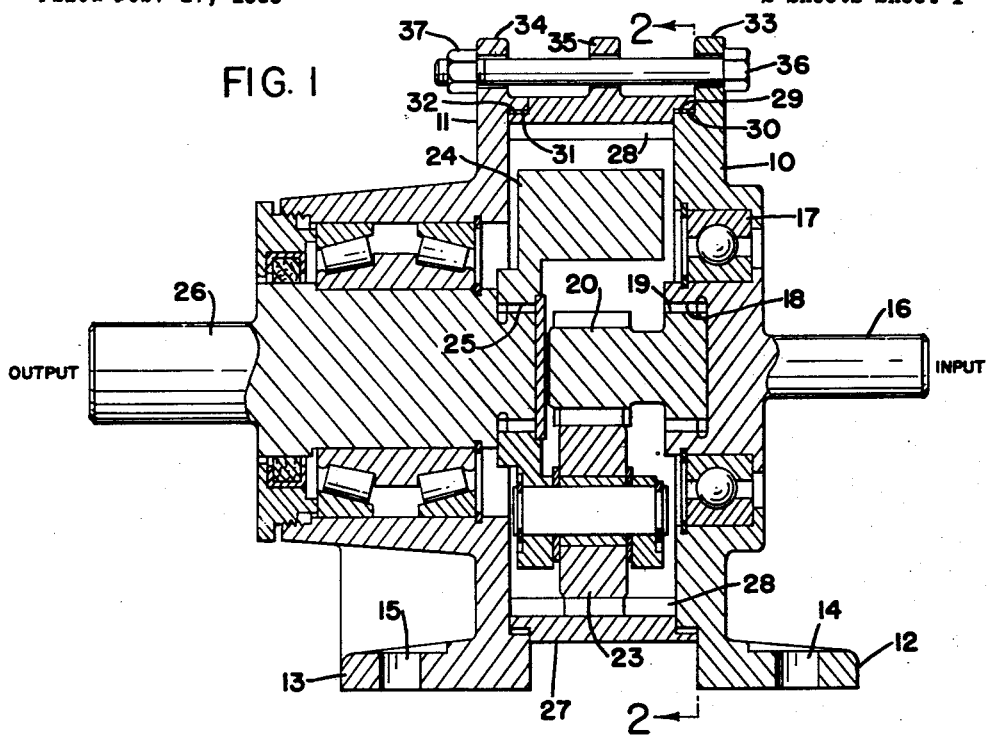
Figure 1 is a central vertical sectional view through a first embodiment of a speed reducer according to the present invention, taken along the line 1—1 in Figure 2.

Referring first to Fig. 1, the present speed reducer has a housing which includes spaced opposite end walls 10 and 11 which have flat mounting feet 12 and 13, respectively, at their lower ends. These mounting feet are provided with downwardly extending holes 14 and 15, which are larger in cross section than the respective mounting bolts which they are to receive.

The housing end wall 10 provides a rotatable support for the rotary input shaft 16. A conventional ball bearing assembly 17 is disposed between the end wall 10 and the input shaft 16 for this purpose. At the inner side of the housing end wall 10 the input shaft 16 is formed with a splined axial opening 18 which receives the splined axial extension 19 of the sun gear 20. The splined extension 19 of the sun gear has limited radial play in the opening 18 so that the sun gear has limited radial adjustment with respect to the input shaft 16. This enables the sun gear to self-align itself radially with respect to its planet gears.

Figure 2:
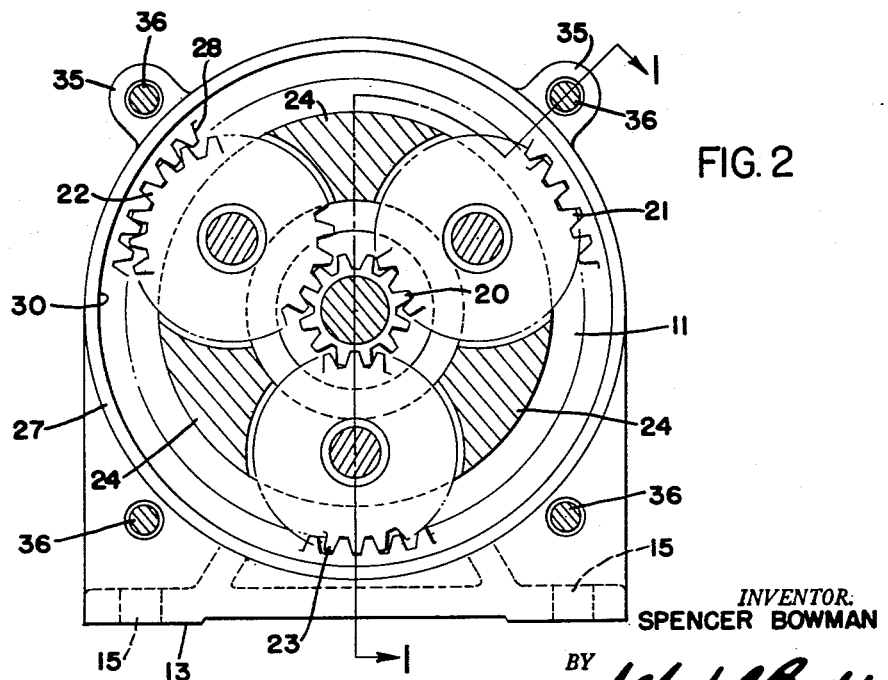
Figure 2 is a vertical cross section through the speed reducer of Fig. 1, taken along the line 2—2 in Fig. 1.

In the embodiment shown in Figs. 1 and 2, the sun gear 20 drives three planet gears 21, 22 and 23 respectively, which are positioned at equidistant locations around the periphery of the sun gear. The planetary gears 21–23 are mounted rotatably on a rotatable gear carrier 24, which presents a splined axial opening 25 at its end facing away from the input shaft. The output shaft 26 has a splined end received in this opening in the gear carrier so that the output shaft turns with the gear carrier. The splined connection between the planet gear carrier 24 and the output shaft is rather loose, enabling radial movement of the gear carrier of about .030 inch. Thus, the gear carrier has a floating mount which compensates for non-uniformity in gear diameters, tooth spacing and contours. The output shaft is suitably rotatably mounted at the housing end wall 11 and extends beyond this end wall for connection to the device to be driven.

In accordance with the present invention, there is provided a novel ring gear extending around the planetary gears 21—23 and meshing therewith. This ring gear includes an outer ring portion 27 and gear teeth 28 at the inside of this ring portion which mesh with the teeth on the planet gears 21—23. The teeth 28 on the ring gear are the usual spur gear teeth, having an outline in the form of an involute curve, as are the teeth on the planet gears and the sun gear. In accordance with the present invention, the outer ring portion 27 has a thickness which enables the entire ring gear to be flexible or distortable radially from its normal circular shape.

Figure 3:
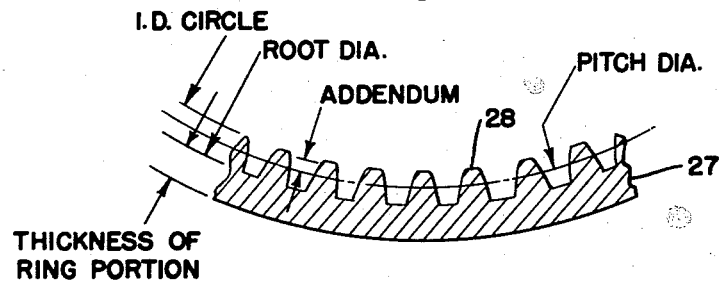
Figure 3 is an enlarged elevational view of the ring gear in the speed reducer of Figs. 1 and 2.

Prior to the present invention, it has been the practice to make such ring gears rigid. To this end, such gears were always constructed so that the thickness of the outer ring portion at the root of the gear teeth was appreciably greater than the addendum of the gear teeth (the addendum being the difference between the radius of the pitch circle and the radius of the inner diameter circle of the ring gear, as indicated in Fig. 3). For high speed operation, the ratio of the thickness of the outer ring portion to the addendum might be as great as 6 to 1.

In the present invention, this ratio is substantially reduced in order to insure that the entire ring gear is distortable radially under heavy loads, so as to tend to equalize the loading on all of the planetary gears. For this purpose, the following tables give what I consider to be the optimum ranges for the ratio of the radial thickness of the outer ring portion 27 of the ring gear to the addendum of the teeth 28 on this ring gear for different types of planetary gear systems at various speeds of operation:

*Three planetary gear system*

| | |
|---|---|
| Precision (Ultra-High Speed) | 1.2–1.6 |
| Accurate (High Speed) | 1.0–1.4 |
| Quality (Medium Speed) | 0.8–1.2 |
| Commercial (Low Speed) | 0.6–1.0 |

*Four planetary gear system*

| | |
|---|---|
| Precision (Ultra-High Speed) | 1.5–2.0 |
| Accurate (High Speed) | 1.3–1.8 |
| Quality (Medium Speed) | 1.1–1.5 |
| Commercial (Low Speed) | 0.8–1.3 |

From the foregoing, it will be evident that the present invention contemplates a speed reducer of the planetary gear type in which the radial thickness of the outer ring portion of the ring gear is not greater than twice the addendum of the teeth on the ring gear. With this construction of the ring gear, it is capable of radial distortion under heavy loads, so as to act to equalize the loads on all of the planet gears.

As shown in Fig. 1, the housing end wall 10 at the input side of the speed reducer is formed with a radially outwardly facing rabbet 29. The ring gear 27, 28 presents at this end a radially inwardly facing rabbet 30, which is spaced a slight distance outward radially from the rabbet 29. The opposite housing end wall 11 is formed with a radially inwardly facing rabbet 31 and at this end wall the ring gear 27, 28 presents a radially outwardly facing rabbet 32 which is spaced slightly from the rabbet 31.

At its upper end the housing end wall 10 is provided with a pair of spaced integral bosses 33. In like manner, the opposite housing end wall 11 is provided with similar bosses 34 and the ring gear 27, 28 carries bosses 35. Tie rods 36 extend through aligned openings in these bosses 33, 34 and 35. These tie rods are provided with nuts 37 on one end which may be clamped tight in order to force the end walls 10 and 11 tightly against the ring gear 27, 28. The openings in the bosses 33 and 34 are slightly oversized to permit turning of the end walls 10 and 11. Similar openings and tie rods 36 are provided at the lower ends of the end walls 10 and 11 at either side, as shown in Fig. 2.

The tie rod clamping arrangement imparts sufficient rigidity to the entire housing that it is capable of resisting twisting forces in a plane through the central axis of the housing.

While the tie rods maintain the housing end walls 10 and 11 and the ring gear 27, 28 fixedly positioned with respect to each other under normal conditions, the axial clamping force exerted by the tie rods does not completely prevent either of the end walls or the ring gear from turning with respect to the others.

For example, the supporting surface on which the feet 12, 13 of the housing end walls may be irregular or nonplanar. In such event, as the mounting bolts which are inserted into the openings 14 and 15 in the mounting feet 12 and 13 are tightened to draw the feet tight against the supporting surface, the respective housing end walls 10 and 11 are capable of turning slightly so as to accommodate any irregularities in the supporting surface. Such adjustment imposes no stresses on the shafts or on the gearing in the device. As already mentioned, the openings 14 and 15 in the mounting feet are slightly oversized to permit such adjustment to take place without imposing any strain on the end walls or their mounting feet.

Also, in the event of shock loading on the speed reducer, such as might occur in the event of a rapid start or stop, the ring gear 27, 28 is capable of turning, as well as distorting radially, in order to minimize the shock to the gear teeth.

The elongated tie rods 36 are somewhat resilient and, in effect, they constitute springs which enable such turning movement of either end wall 10 or 11 or the ring gear 27, 28 to take place.

From the foregoing, it will be apparent that the present speed reducer is capable of improved operation in a number of respects. The radial distortability of the ring gear 27, 28 enables the equalization of the loads on the individual planet gears at heavy loads, thereby avoiding the primary cause of failure of speed reducers of this general type. The floating mountings of the sun gear, the planet gear carrier, and the ring gear enable the various gears to self-align themselves so as to proportion or equalize the loading therebetween, so that the problem of manufacturing tolerances is reduced. In addition, they enable the speed reducer to be assembled readily by inexperienced or relatively unskilled personnel, and the reducer may be quickly taken apart and the planet gears changed to provide a different speed ratio. Also, the adaptability of the ring gear to turn minimizes the likelihood of damage to any of the gear teeth in case of shock loading, such as due to rapid starts or stops. The adjustability of the housing end walls enables the speed reducer to be mounted on irregular surfaces without imposing a strain on the device.

Figure 4:
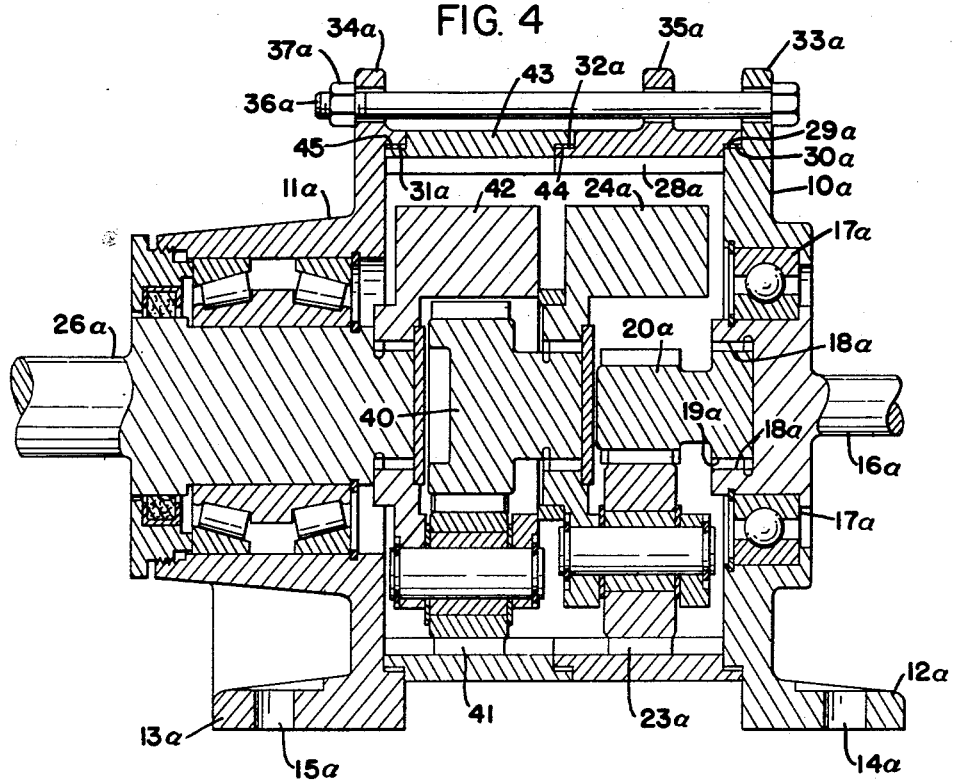
Fig. 4 is a view similar to Fig. 1 and showing an alternative embodiment of the present invention in which the planetary gears are stacked axially.

In the embodiment of the present invention, which is illustrated in Figure 4, the same principles of construction are followed in a speed reducer having a pair of axially stacked ring gears. In this embodiment, the same reference numerals are given for the corresponding elements in Figs. 1 and 2, with the subscript "a" added.

In this embodiment, the planetary gear carrier 24a is splined to a second sun gear 40, which meshes with a plurality of planetary gears 41 mounted rotatably on a second rotary gear carrier 42. The latter is splined to the output shaft 26a. A second ring gear 43 extends around the planetary gears 41 and the sun gear 40. This second ring gear is constructed in accordance with the same principles as the first ring gear, which has already been described in detail. The gear teeth on the second ring gear 43 mesh with the gear teeth on the second group of planetary gears 41.

At one end the ring gear 43 presents a radially inwardly facing rabbet 44 which overlies the outwardly facing rabbet 32a on the first ring gear. A slight radial clearance is provided between these rabbets so that the respective ring gears are capable of turning slightly with respect to one another. At its opposite end, the second ring gear 43 presents a radially outwardly facing rabbet 45 which the inwardly facing rabbet 31a on the end wall 11 overlies. There is a similar slight radial clearance between these rabbets so that the housing end wall 11a is capable of turning slightly with respect to the second ring gear.

The operation of this embodiment is substantially the same as the first embodiment, the only essential difference being in the number of speed ratios which are obtainable from the stacked arrangement in Fig. 4. Obviously this stacking principle may be extended to provide any desired number of sun gear, planetary gear groups, and corresponding ring gears.

While both of the illustrated embodiments are directed to a three planetary gear system in the speed reducer, the invention is as readily applicable to systems employing four or more planetary gears with each sun gear.

Also, it is to be understood that, while two embodiments of this invention have been described in detail, and shown in the drawings to illustrate the principles of the present invention, various modifications, omissions and refinements which depart from these embodiments may be adopted without departing from the spirit and scope of this invention.

Having thus described my invention, I claim:

1. In a speed changer comprising a sun gear, input drive means coupled to the sun gear to drive the latter, and a plurality of planet gears spaced around the periphery of the sun gear and in meshing engagement therewith to be driven thereby, the improvement which comprises: a ring gear having an outer ring portion and a plurality of gear teeth at the inside of said ring portion which mesh with said planet gears, the radial thickness of said outer ring portion of the ring gear at the roots of its teeth being less than two times the addendum of the gear teeth on said ring gear, whereby said outer ring portion is distortable radially to equalize the load on the planet gears.

2. In a speed changer comprising a rotatable sun gear, input drive means coupled to the sun gear to rotate the latter, a plurality of rotatable planet gears spaced around the periphery of the sun gear and in meshing engagement therewith to be driven thereby, the improvement which comprises: a ring gear having an outer ring portion which extends around the planet gears and a plurality of gear teeth at the inside of said outer ring portion which mesh with said planet gears, housing means continuously engaging and normally holding said ring gear stationary, said ring gear being mounted to turn relative to said housing means about the rotational axis of said sun gear under shock loading, and said outer ring portion of the ring gear being distortable radially to equalize the loads on the planet gears.

3. The speed changer of claim 2 wherein the radial thickness of the outer ring portion of the ring gear is less than two times the addendum of the gear teeth on said ring gear.

4. A speed changer comprising a pair of spaced separate housing end walls, means for mounting said end walls individually on a support, sun gear means rotatably mounted between said end walls, a rotatable input shaft extending through one of said end walls and coupled to said sun gear means, a plurality of planet gears between said end walls spaced around the periphery of said sun gear means and in meshing engagement therewith to be driven thereby, rotatable carrier means for said planet gears, ring gear means of substantial axial extent disposed between said end walls and separating said end walls by an amount equal to the axial extent of the ring gear means and constituting the remainder of the housing of the speed changer, said ring gear means extending around and meshing with the planet gears to be driven thereby, said ring gear means being mounted to turn with respect to said end walls about the rotational axis of said sun gear under shock loading and an output shaft extending rotatably through the other of said end walls.

5. The speed changer of claim 4 wherein said ring gear means includes a ring gear member having an outer ring portion and a plurality of gear teeth at the inside of said ring portion which mesh with said planet gears, said outer ring portion being distortable radially to equalize the loads on the planet gears.

6. The speed changer of claim 5 wherein the radial thickness of said outer ring portion is less than two times the addendum of the gear teeth on said ring gear member.

7. The speed changer of claim 4 wherein the ring gear means is in the form of a single ring gear engaged between said end walls and rotatable with respect thereto.

8. The speed changer of claim 4 wherein said ring gear means comprises a first ring gear engaging said one end wall and extending axially therefrom, said one wall and said first ring gear being capable of turning with respect to one another, and additional ring gear means extending axially from the opposite end of said first ring gear to the other of said end walls, said additional ring gear means and said first ring gear being capable of turning with respect to one another, and said other end wall and said additional ring gear means being capable of turning with respect to one another.

9. In a speed changer having a rotary sun gear means, a rotary input shaft, planet gear means disposed around the periphery of said sun gear means and meshing therewith, rotatable carrier means for said planet gear means, an output shaft coupled to said carrier means, and ring gear means extending around the periphery of said planet gear means and meshing therewith, the improvement which comprises: a pair of opposite housing end walls which are separate from one another and which rotatably receive the input shaft and the output shaft, respectively, each of said end walls being turnable with respect to the other end wall and with respect to said ring gear means about the axis of the respective shaft, each of said end walls having a mounting portion offset to one side of the respective shaft.

10. A speed changer comprising first and second housing end walls which are separate from each other and spaced apart axially, ring gear means of substantial axial extent, said ring gear means being engaged between and separating said end walls by an amount equal to the axial extent of said ring gear means, said end walls and said ring gear means constituting the housing of the speed changer, a rotary input shaft extending through said first end wall, sun gear means rotatably mounted between said end walls and coupled to said input shaft to be driven thereby, a plurality of planet gears between said end walls spaced around the periphery of said sun gear means and in meshing engagement with said sun gear means and with said ring gear means, rotatable carrier means carrying said planet gears, a rotatable output shaft coupled to said rotatable carrier means and extending through said second end wall, said first housing end wall having a mounting portion offset to one side of the input shaft and being turnable with respect to said second end wall and with respect to said ring gear means about the axis of said input shaft, said second housing end wall having a mounting portion offset to one side of the output shaft and being turnable with respect to said first end wall and with respect to said ring gear means about the axis of said output shaft.

11. The speed changer of claim 10 wherein said ring gear means includes a ring gear member having an outer ring portion and a plurality of gear teeth at the inside of said ring portion which mesh with said planet gears, the radial thickness of said outer ring portion at the roots of its teeth being less than two times the addendum of the gear teeth on said ring gear member so that said outer ring portion is distortable radially to equalize the load on the planet gears.

12. The speed changer of claim 11 wherein said first and second end walls continuously engage said ring gear means and normally hold said ring gear means stationary, said ring gear means being mounted to turn relative to said end walls about the rotational axis of the sun gear under shock loading.

13. In a speed changer comprising a rotatable sun gear, input drive means coupled to the sun gear to rotate the latter, and a plurality of rotatable planet gears spaced around the periphery of the sun gear and in meshing engagement therewith, the improvement which comprises a ring gear having an outer ring portion which extends around the planet gears and gear teeth at the inside of said outer ring portion which mesh with said planet gears, means continuously engaging and normally holding said ring gear stationary, said ring gear being mounted to turn relative to said last-mentioned means about the rotational axis of the sun gear under shock loading, said outer ring portion of the ring gear being distortable radially to equalize the loads on the planet gears, and a planetary gear carrier which carries said planet gears and is floatingly mounted for adjustment radially to permit self-alignment of the planet gears with respect to the sun gear and the ring gear.

14. The speed changer of claim 13 wherein the radial thickness of said outer ring portion of the ring gear is less than two times the addendum of the gear teeth thereon.

References Cited in the file of this patent

UNITED STATES PATENTS

| | | |
|---|---|---|
| 1,925,943 | Stein | Sept. 5, 1933 |
| 2,498,828 | Sheppard | Feb. 28, 1950 |
| 2,591,743 | Thompson | Apr. 8, 1952 |
| 2,625,047 | Wood | Jan. 13, 1953 |
| 2,690,685 | Denandt | Oct. 5, 1954 |
| 2,737,064 | Stoeckicht | Mar. 6, 1956 |